(12) United States Patent
Daniels

(10) Patent No.: US 10,624,310 B1
(45) Date of Patent: Apr. 21, 2020

(54) TIPPING LIVESTOCK HANDLING CHUTE APPARATUS

(71) Applicant: Danny D. Daniels, Ainsworth, NE (US)

(72) Inventor: Danny D. Daniels, Ainsworth, NE (US)

(*) Notice: Subject to any disclaimer, the term of this patent is extended or adjusted under 35 U.S.C. 154(b) by 441 days.

(21) Appl. No.: 15/680,966

(22) Filed: Aug. 18, 2017

(51) Int. Cl.
A01K 1/06 (2006.01)
A61D 3/00 (2006.01)
A01L 13/00 (2006.01)

(52) U.S. Cl.
CPC .......... A01K 1/0613 (2013.01); A01L 13/00 (2013.01); A61D 2003/006 (2013.01)

(58) Field of Classification Search
CPC .................................................. A01K 1/0613
USPC .................................................. 119/752, 843
See application file for complete search history.

(56) References Cited

U.S. PATENT DOCUMENTS

| | | | | |
|---|---|---|---|---|
| 2,000,122 A * | 5/1935 | Cameron | ................. | A61D 3/00 119/723 |
| 2,446,769 A * | 8/1948 | Keirsey | ................. | A01K 1/0613 119/723 |
| 2,458,582 A * | 1/1949 | Flohr, Jr. | ............. | A01K 1/0613 119/723 |
| 2,737,153 A * | 3/1956 | Dupont | .................... | A61D 3/00 119/723 |
| 3,276,433 A * | 10/1966 | Tougas | ................. | A01K 1/0613 119/722 |
| 3,590,784 A * | 7/1971 | Fly | ............................ | A61D 3/00 119/722 |
| 3,960,113 A * | 6/1976 | Kratky | ................. | A01K 1/0613 119/723 |
| 4,214,555 A * | 7/1980 | Sawby | ................. | A01K 1/0613 119/723 |
| 5,282,441 A * | 2/1994 | Ricketts | ............... | A01K 1/0613 119/724 |
| 5,441,016 A * | 8/1995 | Ricketts | ............... | A01K 1/0613 119/723 |
| 5,669,332 A * | 9/1997 | Riley | .................... | A01K 1/0613 119/724 |
| 8,240,276 B1 | 8/2012 | Daniels et al. | | |
| 9,101,440 B2 * | 8/2015 | Jubinville | ............... | A61D 3/00 |
| 9,578,852 B1 * | 2/2017 | Riley | .................... | A01K 15/04 |
| 9,591,829 B2 * | 3/2017 | Beavers | ................. | A01L 13/00 |
| 2009/0078217 A1 * | 3/2009 | Riley | .................... | A01K 1/0017 119/723 |
| 2011/0146591 A1 * | 6/2011 | Pingsterhaus | ........ | A01K 1/0613 119/732 |
| 2019/0297840 A1 * | 10/2019 | Coulter | ................ | A01K 29/005 |

* cited by examiner

Primary Examiner — Christopher D Hutchens
(74) Attorney, Agent, or Firm — Dennis L. Thomte; Thomte Patent Law Office LLC (57) ABSTRACT

A tipping livestock handling apparatus is provided which includes a support frame positioned on the ground. A squeeze chute or other type of animal handling chute is positioned on the chute frame. The chute is pivotally secured to the support frame and is pivoted between an upright position and a horizontally disposed position by way of hydraulic cylinders so that the legs and feet of the animal in the chute are accessible for treatment.

2 Claims, 10 Drawing Sheets

TIPPING LIVESTOCK HANDLING CHUTE APPARATUS

BACKGROUND OF THE INVENTION

Field of the Invention

This invention relates to livestock handling equipment and more particularly to a livestock handling chute for selectively immobilizing an animal in a standing position to allow any number of operations to be safely performed on the animal. Even more particularly, this invention relates to a tipping livestock handling chute which enables the livestock chute to be tipped or tilted approximately 90 degrees from its upright position so that the feet and legs of the animal will be positioned in a generally horizontal position to enable a veterinarian or other person to work on the feet or legs of the animal. Even more particularly, this invention includes structure which engages the underside of the animal between the front and rear legs of the animal to prevent the animal from moving downwardly in the chute as the chute is moved from its normal upright position to its tipped position and vice versa.

Description of the Related Art

Livestock chutes or squeeze chutes have long been used to retain the animals in an upright position for palpating, immunizations, branding, treating, weighing, loading, etc. Assignee's U.S. Pat. No. 8,240,276 discloses a squeeze chute apparatus which has met with considerable success. Although Assignee's squeeze chute apparatus of U.S. Pat. No. 8,240,276 made it possible to safely and conveniently work on the animal while the animal is in a standing position, it is difficult to work on the legs and feet (hooves) of the animal. Some prior art devices have been provided for tipping or tilting the animal so that the legs and feet of the animal are in a position whereby they may be worked upon. However, the prior art tipping devices are believed to be unstable. Further, the prior art tipping chutes or devices do not have any means for preventing the animal in the chute from moving downwardly in the chute as the chute is being moved from its upright position to its tipped position and vice versa. The downward movement of the animal in the chute as the chute is being tipped may result in injury to the animal or may place the animal in a position wherein the legs and feet of the animal are not easily accessible.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A tipping livestock handling chute apparatus is disclosed. The apparatus includes a horizontally disposed support frame having a first end, a second end, an inner end, and an outer end. A vertically disposed first support post, having upper and lower ends, extends upwardly from the support frame at the outer end thereof. A vertically disposed second support post, having upper and lower ends, extends upwardly from the support frame at the outer end thereof. The first and second support posts are horizontally spaced from one another. The support frame also includes a vertically disposed first pivot post having upper and lower ends, extending upwardly from the support frame inwardly of the outer end thereof. A vertically disposed second pivot post, having upper and lower ends, extends upwardly from the support frame inwardly of the outer end thereof. The first and second pivot posts are horizontally spaced from one another.

The apparatus also includes a first hydraulic cylinder, having a base end and a rod end, with the base end of the first hydraulic cylinder being pivotally secured to the support frame inwardly of the outer end thereof. The first hydraulic cylinder is movable between retracted and extended positions. The apparatus also includes a second hydraulic cylinder, having a base end and a rod end, with the base end of the second hydraulic cylinder being pivotally secured to the support frame inwardly of the outer end thereof. The second hydraulic cylinder is movable between retracted and extended positions. The first and second hydraulic cylinders are horizontally spaced from one another.

The apparatus also includes a livestock chute assembly which is selectively movably positioned on the support frame between the inner end of the support frame and the first and second pivot posts. The livestock handling chute assembly includes a chute frame having an entrance end, an exit end, an upper end, a lower end, a first side, and a second side. The chute is positioned within the chute frame and has an entrance gate assembly, an exit gate assembly, an upper end, a lower end, a first side, and a second side. The assembly also includes a hinged floor at the lower end of the chute which is selectively movable between open and closed positions.

The upper end of the first pivot post is pivotally secured to the first side of the chute frame above the lower end of the chute frame at the entrance end of the chute frame. The upper end of the second pivot post is pivotally secured to the first side of the chute frame above the lower end of the chute frame at the exit end of the chute frame. The rod end of the first hydraulic cylinder is pivotally secured to the first side of the chute frame above the lower end of the chute frame. The rod end of the second hydraulic cylinder is pivotally secured to the first side of the chute frame above the lower end of the chute frame. The extension of the first and second hydraulic cylinders causes the chute frame and the chute to be pivotally moved between an upright position on the support frame to a tipped position with the chute frame resting on the upper ends of the first and second support posts. The hinged floor is movable from a closed position to an open position when the chute frame and chute are in the tipped position, whereby the legs and feet of an animal in the chute are accessible for treatment.

The tipping livestock handling chute apparatus of this invention also includes an animal support plate which is movably positioned above a portion of the floor with the support plate being movable between a lower position above the floor to an upper position thereabove for engagement with the belly of the animal between the front and rear legs of the animal and wherein a third hydraulic cylinder extends between the chute frame and the support plate for selectively moving the support plate between its lower position and its upper position.

It is therefore a principal object of the invention to provide an improved tipping livestock handling chute apparatus.

A further object of the invention is to provide a tipping livestock handling chute apparatus wherein the chute thereof may be pivotally moved from an upright position to a horizontally disposed position so that the feet and legs of the animal in the chute are accessible.

A further object of the invention is to provide a tipping livestock handling chute apparatus which is economical of manufacture, durable in use and refined in appearance.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the livestock tipping chute assembly of this invention. Tipping chute assembly 10 includes a tipping support frame 12 and a chute 14. Chute 14 is substantially identical to the chute described and shown in U.S. Pat. No. 8,240,276, the disclosure of which is incorporated herein by reference thereto to complete this disclosure if necessary. The chute 14 with structure associated therewith will not be described in detail. For example, the hydraulic cylinder for moving the entrance gate member and the exit gate member will not be described. Further, the hydraulic cylinder for moving the squeeze panel between their squeezing position and their non-squeezing position will not be described. As stated, U.S. Pat. No. 8,240,276 is relied upon to complete this disclosure, if necessary.

The chute 14 has a few structural frame members, which are not shown in the '276 patent, to enable the chute 14 to be tipped. Tipping support frame 12 includes a horizontally disposed frame member 16 having ends 18 and 20. Frame member 16 is parallel to the side of the chute 14. A horizontally disposed frame member 22, having ends 24 and 26, extends transversely from end 18 of frame member 16. A short frame member or stub 28 extends transversely from end 26 of frame member 22 and has a horizontally disposed support plate 30 extending therefrom. A horizontally disposed frame member 32, having ends 34 and 36, extends transversely from end 20 of frame member 16. A short frame member or stub 38 extends transversely from end 36 of frame member 32 and has a horizontally disposed support plate 40 extending therefrom.

Figure 5:
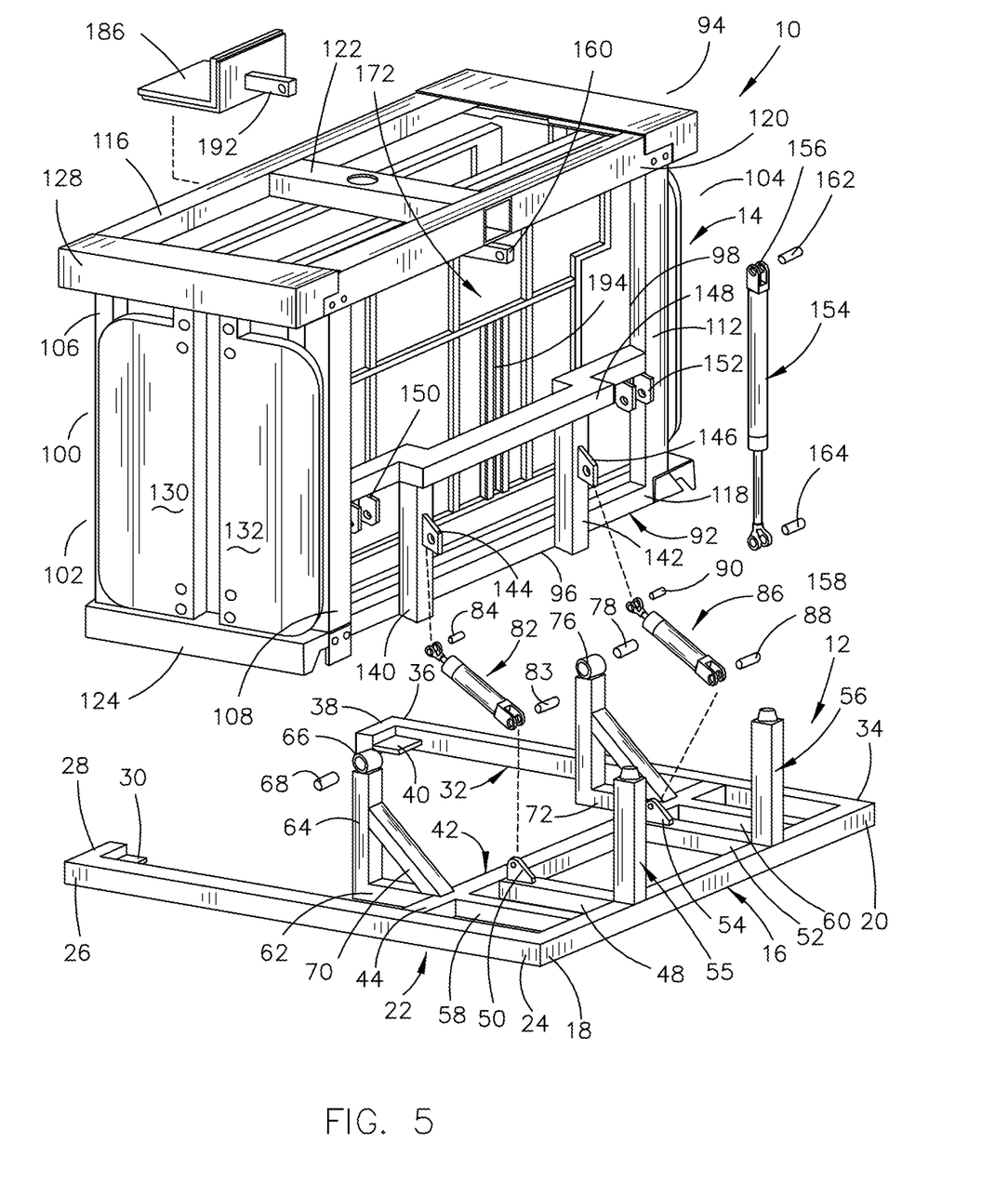
FIG. 5 is an exploded perspective view of the invention.

A horizontally disposed frame member 42, having ends 44 and 46, is secured to and extends between frame members 22 and 32 as seen in FIG. 5 so as to be spaced with respect to frame member 16 and parallel thereto. A horizontally disposed frame member 48 has one end secured to frame member 16 and has its other end secured to frame member 42 inwardly of frame member 22 as seen in FIG. 5. A pivot plate 50 extends upwardly from frame 48 at the inner end thereof. A horizontally disposed frame member 52 has one end secured to frame member 16 and has its other end secured to frame member 42 inwardly of frame member 32 as seen in FIG. 5. A pivot plate 54 extends upwardly from frame member 52 at the inner end thereof. A vertically disposed support post 55, having upper and lower ends, is secured to and extends upwardly from frame member 16 at the outer end of frame member 48. A vertically disposed support post 56, having upper and lower ends, is secured to and extends upwardly from frame member 16 at the outer end of frame member 52.

A horizontally disposed frame member 58 is secured to and extends between frame members 16 and 42 inwardly of frame member 22. A horizontally disposed frame member 60 is secured to and extends between frame members 16 and 42 inwardly of frame member 32. A horizontally disposed frame member 62 is secured to frame member 42 and extends transversely from frame member 42 inwardly of frame member 22. A vertically disposed frame member 64 is secured to frame member 62 and extends upwardly from frame member 62 as seen in FIG. 5. A hollow sleeve 66 is secured to the upper end of frame member 64 which is configured to receive a pivot pin 68 therein. A brace 70 is secured to and extends between frame members 42 and 64 inwardly of frame member 22 (FIG. 5).

A horizontally disposed frame member 72 is secured to frame member 42 and extends transversely from frame member 42 inwardly of frame member 32. A vertically disposed frame member 74 is secured to frame member 72 and extends upwardly therefrom from frame member 72 as seen in FIG. 5. A hollow sleeve 76 is secured to the upper end of frame member 74 which is configured to receive a pivot pin 78 therein. A brace 80 is secured to and extends between frame members 42 and 74 inwardly of frame member 32 (FIG. 5).

The numeral 82 refers to a hydraulic cylinder which has its base end pivotally secured to pivot plate 50 by means of pivot pin 83. The rod end of hydraulic cylinder 82 is configured to receive a pivot pin 84 therein. The numeral 86 refers to a hydraulic cylinder which has its base end pivotally secured to pivot plate 54 by means of pivot pin 88. The rod end of hydraulic cylinder 86 is configured to receive a pivot pin 90 therein.

As stated above, the chute 14 is substantially identical to the chute disclosed in U.S. Pat. No. 8,240,276 except for some frame structure thereon which enables the chute 14 to be connected to the tipping support frame 12 to enable the chute 14 to be tipped from its normal upstanding position to a generally horizontally disposed position to enable the feet and legs of the animal to be in a position to enable the feet and legs of the animal to be treated or worked upon. As stated above, the disclosure of U.S. Pat. No. 8,240,276 is incorporated herein by reference thereto to complete the disclosure if necessary.

Chute 14 generally includes a frame 92 having an upper end 94, lower end 96, first side 98, second side 100, entrance end 102 and exit end 104. Frame 92 includes upstanding frame members 106 and 108 at the entrance end 102 and upstanding frame members 110 and 112 at exit end 104. A horizontally disposed frame member 114 is secured to the lower ends of frame member 106 and 110 and extends therebetween. A horizontally disposed frame member 116 is secured to the upper ends of frame members 106 and 110 and extends therebetween. A horizontally disposed frame member 118 is secured to and extends between the lower ends of frame members 108 and 112 and extends therebetween. A horizontally disposed frame member 120 is secured to the upper ends of frame members 108 and 112 and extends therebetween. Frame member 122 is secured to frame members 116 and 120 and extends therebetween intermediate the lengths thereof.

Frame member 124 is secured to the lower ends of frame members 106 and 108 and extends therebetween. A bracket 126 extends outwardly from the lower end of frame member 106.

A frame member 127 extends between the upper ends of frame members 106 and 108. A protective cover or shield 128 is hingedly secured to frame members 116 and 120 or frame member 127 at entrance end 108. Shield 128 protects various wires, hoses, hydraulic cylinder, etc. and may be opened to service the same. Entrance gate members 130 and 132 are movably mounted at entrance end 102 and are movable between open and closed positions in an identical manner as to the entrance gate members of U.S. Pat. No. 8,240,276.

A frame member 134 extends between the upper ends of frame members 110 and 112. A protective cover or shield 136 is hingedly secured to frame members 110 and 112 or frame member 134 at exit end 104. Shield 136 protects various wires, hoses, hydraulic cylinder, etc. and may be opened to service the same. Bracket 138 extends outwardly from the lower end of frame member 110.

A pair of vertically disposed and horizontally spaced-apart frame members 140 and 142 are secured to frame member 118 and extend upwardly therefrom. Plates 144 and 146 are secured to frame members 140 and 142 respectively and have a pin opening formed therein. A horizontally disposed frame member 148 is secured to the upper ends of frame members 140 and 142 and is secured to frame members 108 and 112. A bracket 150 is secured to frame member 148 at the entrance end of the chute 14. A bracket 152 is secured to frame member 148 at the exit of the chute 14. Bracket 150 is pivotally connected to sleeve 66 on frame member 64 by pivot pin 68. Bracket 152 is pivotally connected to sleeve 76 on frame member 74 by pivot pin 78. The base end of hydraulic cylinder 82 is pivotally connected to pivot plate 50 on frame member 48 by pivot pin 83. The rod end of hydraulic cylinder is pivotally connected to plate 144 on frame member 140 by pivot pin 84. The base end of hydraulic cylinder 86 is pivotally connected to pivot plate 54 on frame member 52 by pivot pin 88. The rod end of hydraulic cylinder 86 is pivotally connected to plate 146 on frame member 148 by pivot pin 90. The numeral 154 refers to an elongated hydraulic cylinder having a base end 156 and a rod end 158. The base end 156 of hydraulic cylinder 154 is connected to an arm 160, which is secured to frame member 120, by pivot pin 162. The rod end 158 is adapted to receive pivot pin 164 therein as will be described in more detail hereinafter.

Figure 3:
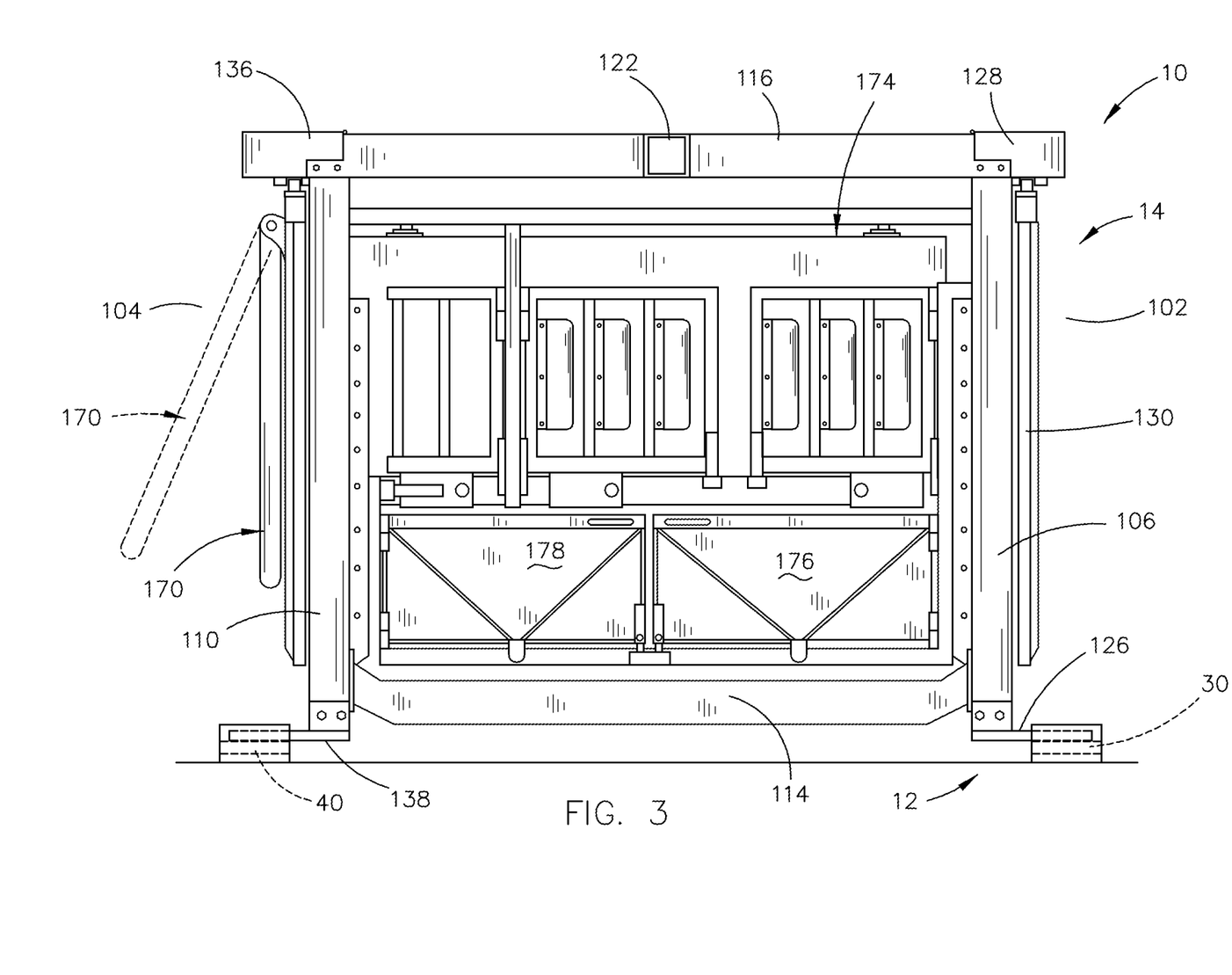
FIG. 3 is a side view of the invention with the broken lines illustrating the neck stretcher in its neck stretching position.

Chute 14 also includes exit gate members 160 and 168 which are movable between open and closed positions in conventional fashion in the same manner as in U.S. Pat. No. 8,240,276. The animal in the chute 10 may exit from the chute 14 when exit gate members 166 and 168 are opened. The numeral 170 refers to a neck stretcher apparatus which is identical to the neck stretcher apparatus of the '276 patent. The neck stretcher apparatus is normally in a vertically disposed position as seen in FIG. 3. The neck stretcher apparatus may be pivoted to the broken line position of FIG. 3 to stretch the neck of the animal as in the '276 patent.

Chute 14 includes a substantially vertically disposed first side panel 172 which movably extends between the entrance and exit ends of the chute 14. Side panel 172 is moved between inner and outer positions as in the '276 patent. Side panel 172 may have doors therein if so desired. Chute 14 also includes a substantially vertically disposed second side panel 174 which movably extends between the entrance and exit ends of the chute 14. Side panel 174 is moved between inner and outer positions as in the '276 patent. Side panel 174 includes at least a pair of doors 176 and 178 mounted at its lower end.

Figure 9:
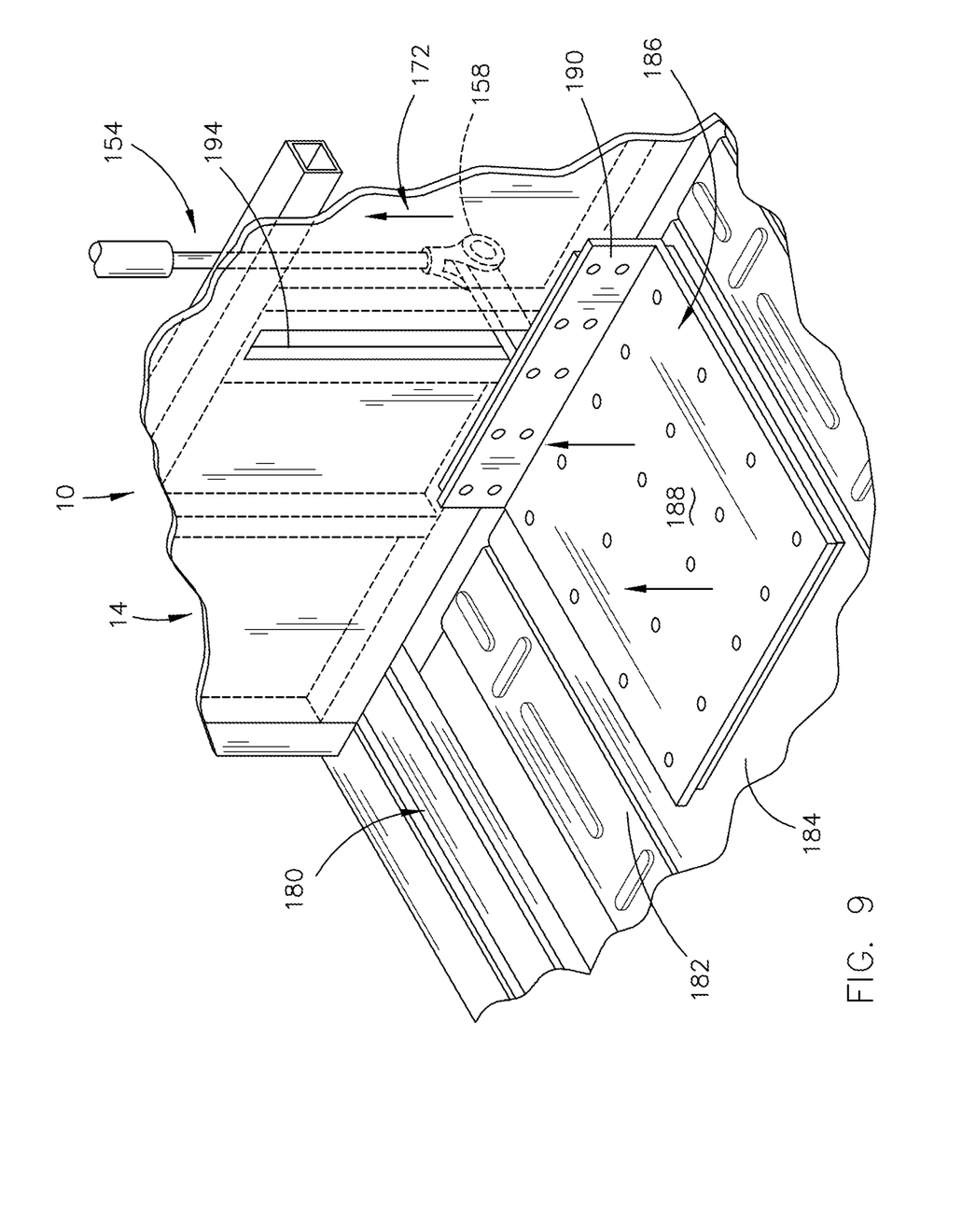
FIG. 9 is a partial perspective view which illustrates the animal support plate in its lower position.
Figure 10:
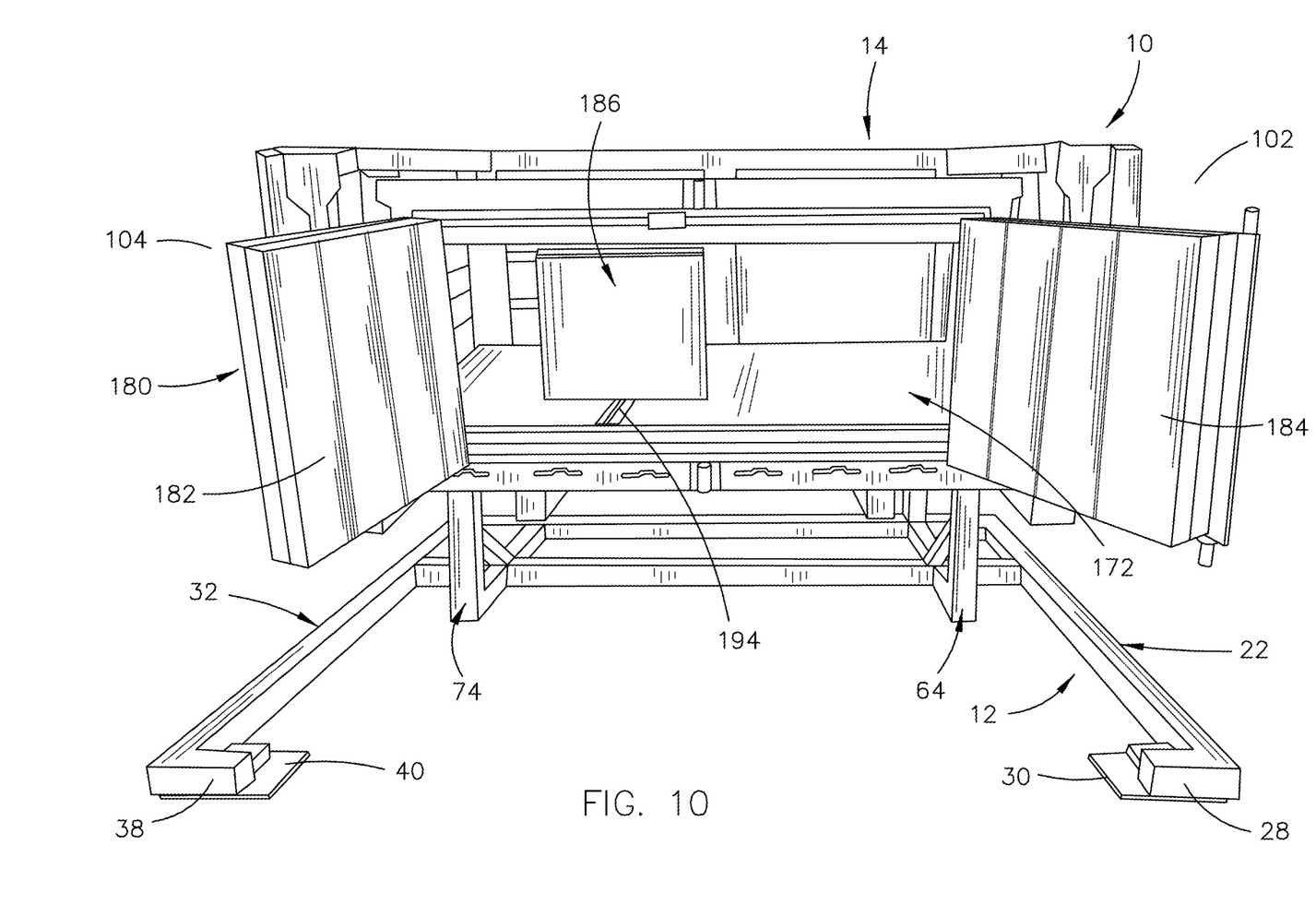
FIG. 10 is a perspective view which illustrates the floor members in their open position.

Chute 14 further includes a floor 180 at the lower end thereof which includes floor members 182 and 184 which may be opened, as seen in FIG. 10, to permit access to the animal's feet when the chute 14 is in its tipped position if so desired as will be described in more detail hereinafter. The numeral 186 refers to an animal support which is positioned on the floor 180 as seen in FIG. 9. Support 186 includes a flat portion 188 having an upstanding portion 190 which is positioned at the inner side of side panel 172. The inner end of support arm 192 is secured to upstanding portion 190 and extends outwardly therefrom. The outer end of support arm 192 is connected to the rod end 158 of hydraulic cylinder 154 by pin 164. The retraction of the cylinder rod of hydraulic cylinder 154 causes support 186 to be moved upwardly from floor 180. The extension of the cylinder rod of hydraulic cylinder 154 causes the support 186 to be moved downwardly from its raised position to its lower position on the floor 180. As seen in FIG. 9, the support arm 192 extends through a guide track 194 positioned on side panel 172.

The tipping livestock chute apparatus of this invention is used as follows. When the chute 14 is in its normal upright position, the brackets 126 and 138 of frame members 106 and 118 respectively will rest upon support plates 30 and 40 respectively. Initially the exit gate member 166 and 168 will be in the closed position with the neck stretcher apparatus 170 being in its vertically disposed position. The side panels 172 and 174 will be in their outer non-squeezing position. Entrance gate members 130 and 132 will be in the open position. At that time, the doors in the side panels will be closed. The animal is then moved into the entrance end of the chute 14, the entrance gate members 130 and 132 are then closed behind the animal. The exit gate members 166 and 168 will then be partially opened so that the animal may be able to stick its head forwardly through the exit gate members 160 and 168 but is not able to move through the exit end of the chute 14. As soon as the animal has stuck its head outwardly from between the exit gate members 166 and 168, the exit gate members 166 and 168 are closed somewhat to trap the animal's head and neck therebetween. The hydraulic cylinders associated with the neck stretcher 170 are then extended somewhat so that the head of the animal is lifted upwardly to immobilize the head of the animal. The side panels 172 and 174 are then moved from their outer positions to their inner positions so as to squeeze the animal therebetween. Various tasks may then be performed on the animal. If there are no tasks to be performed on the animal or if the tasks have been performed and it is desired to perform tasks on the legs and feet of the animal, the following steps will be taken.

Figure 1:
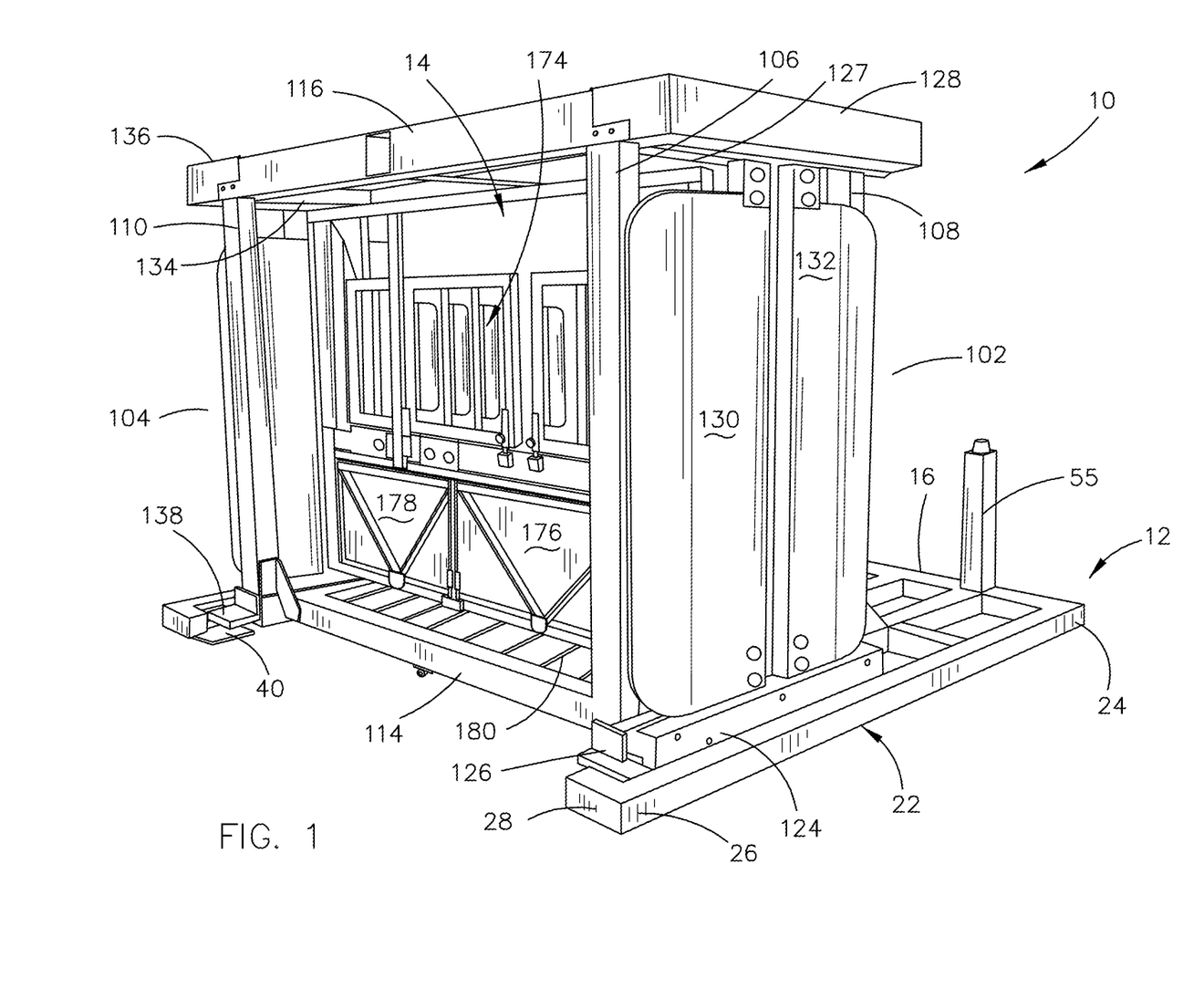
FIG. 1 is a perspective view of the invention with the chute apparatus being in an upright position.
Figure 2:
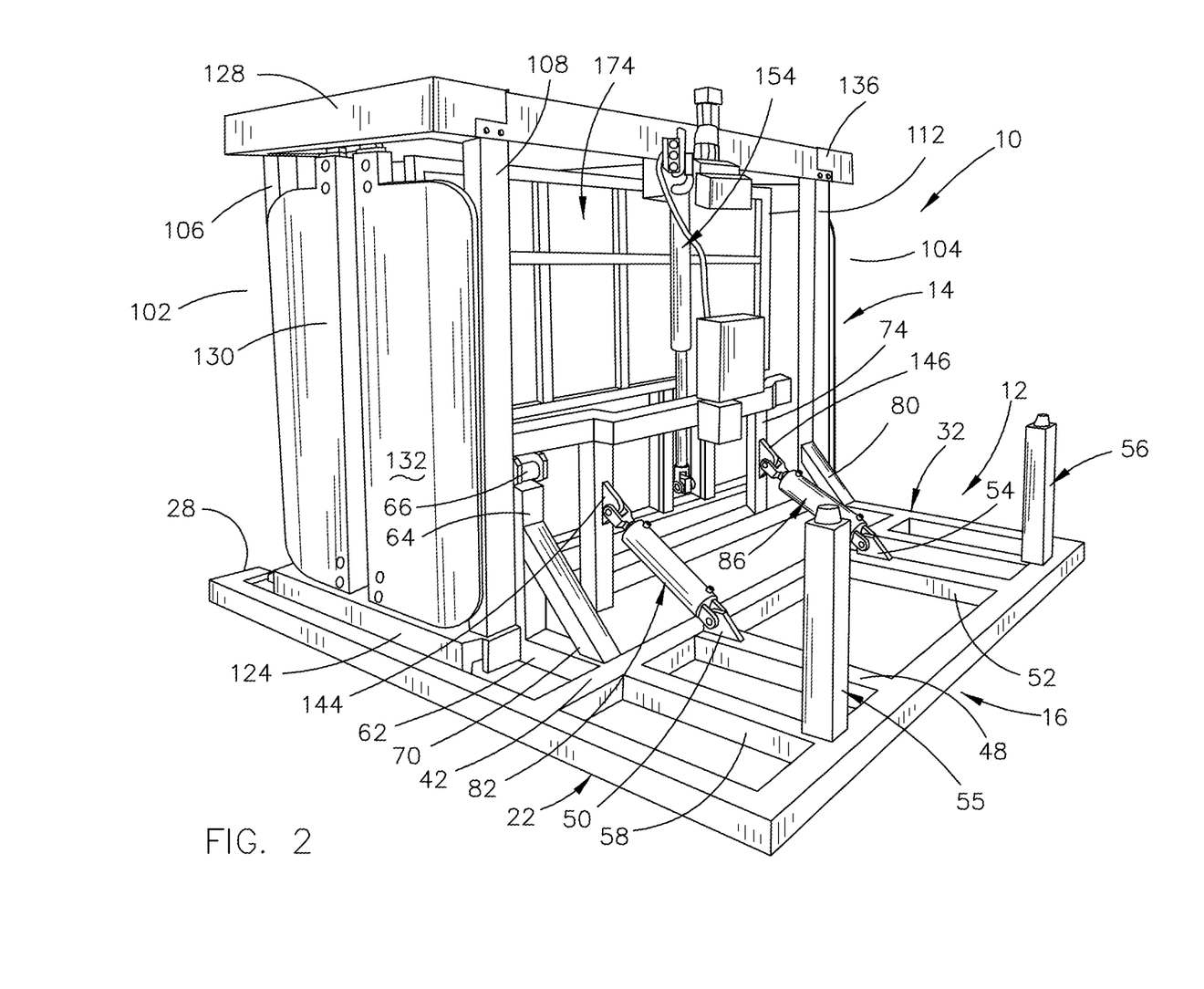
FIG. 2 is another perspective view of the invention with the chute apparatus being in an upright position.
Figure 4:
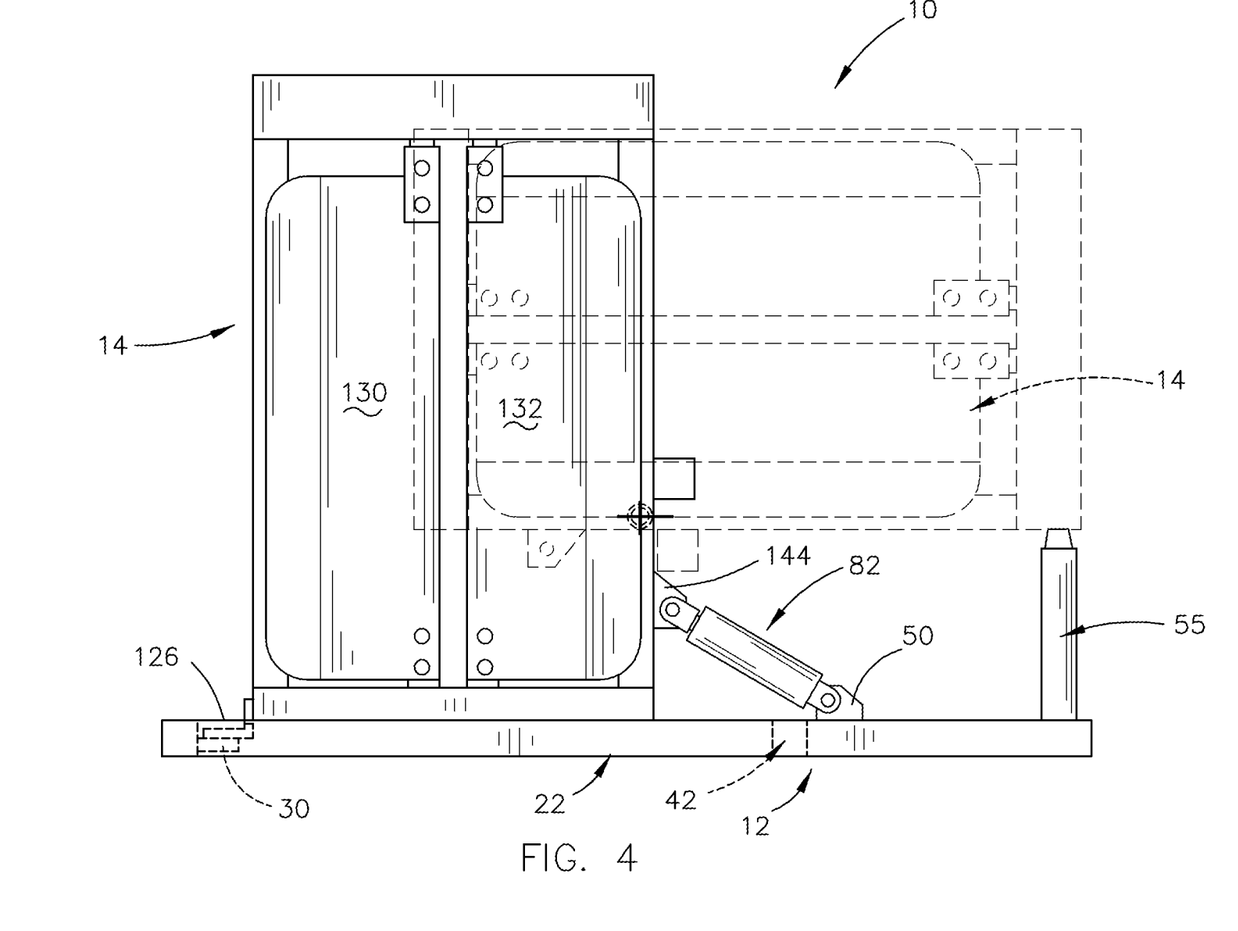
FIG. 4 is an end view of the invention with the broken lines illustrating the chute apparatus in the tipped position.
Figure 6:
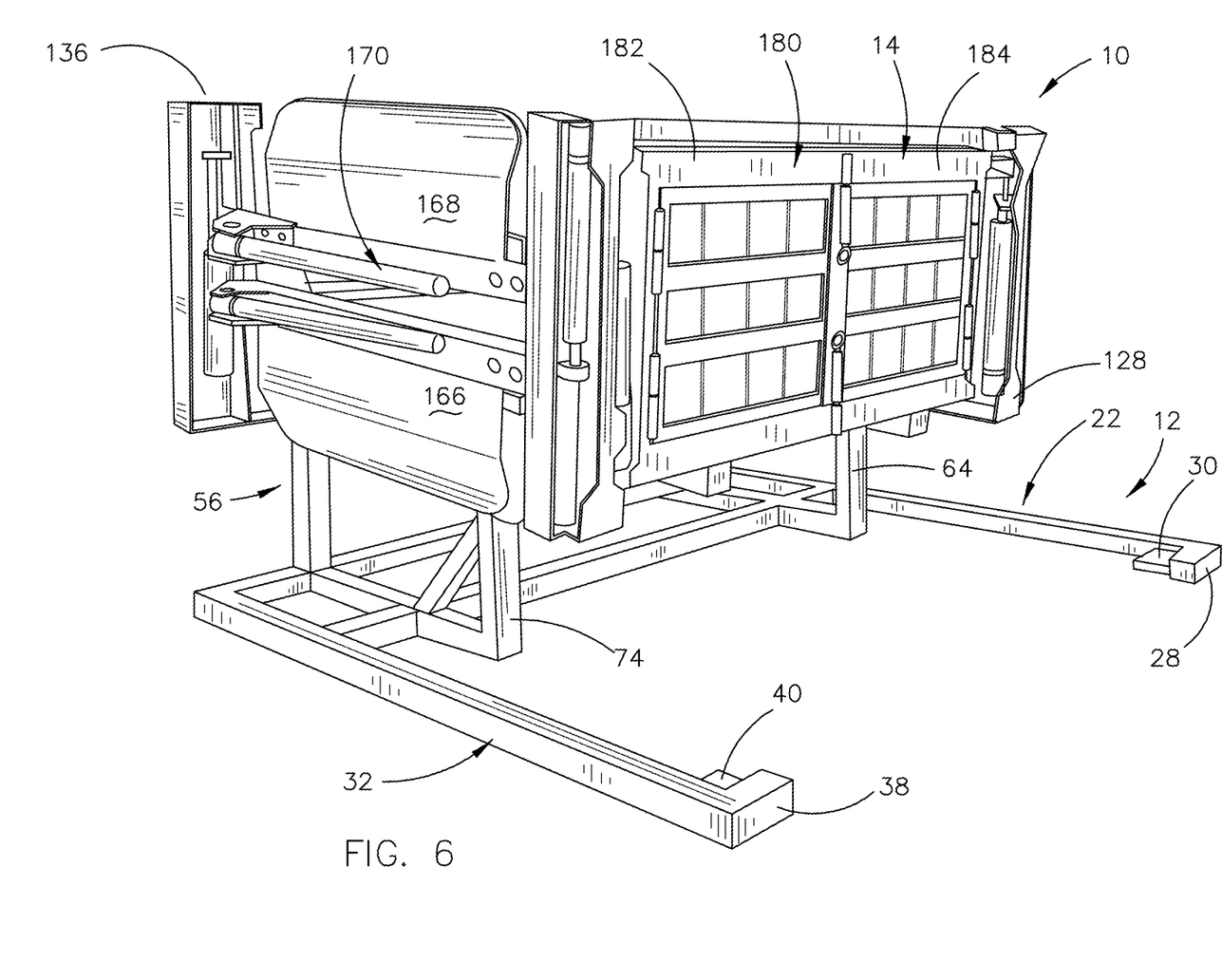
FIG. 6 is a perspective view of the invention with the chute apparatus being in the tipped position.
Figure 7:
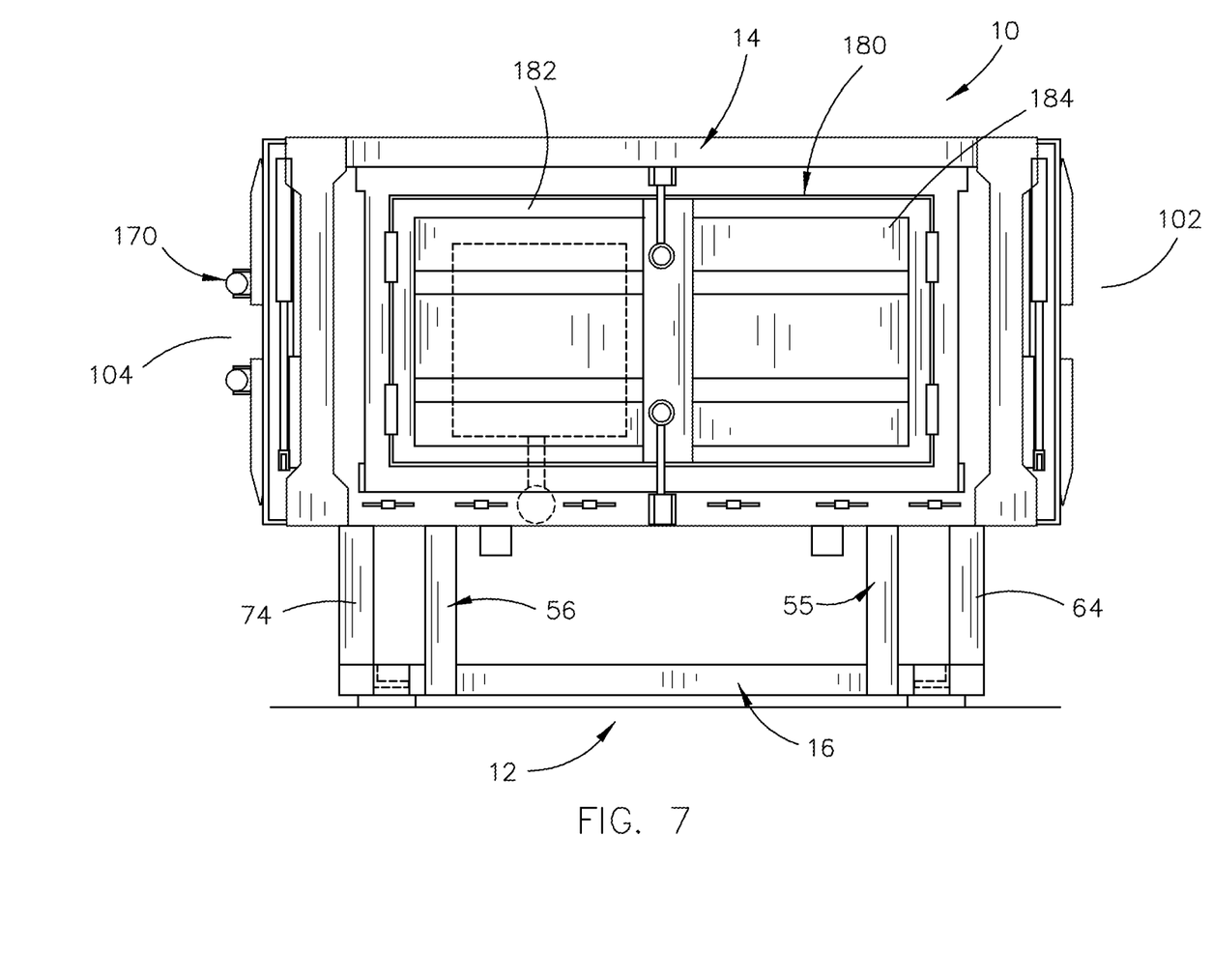
FIG. 7 is a side elevational view of the invention with the chute apparatus being in the tipped position.
Figure 8:
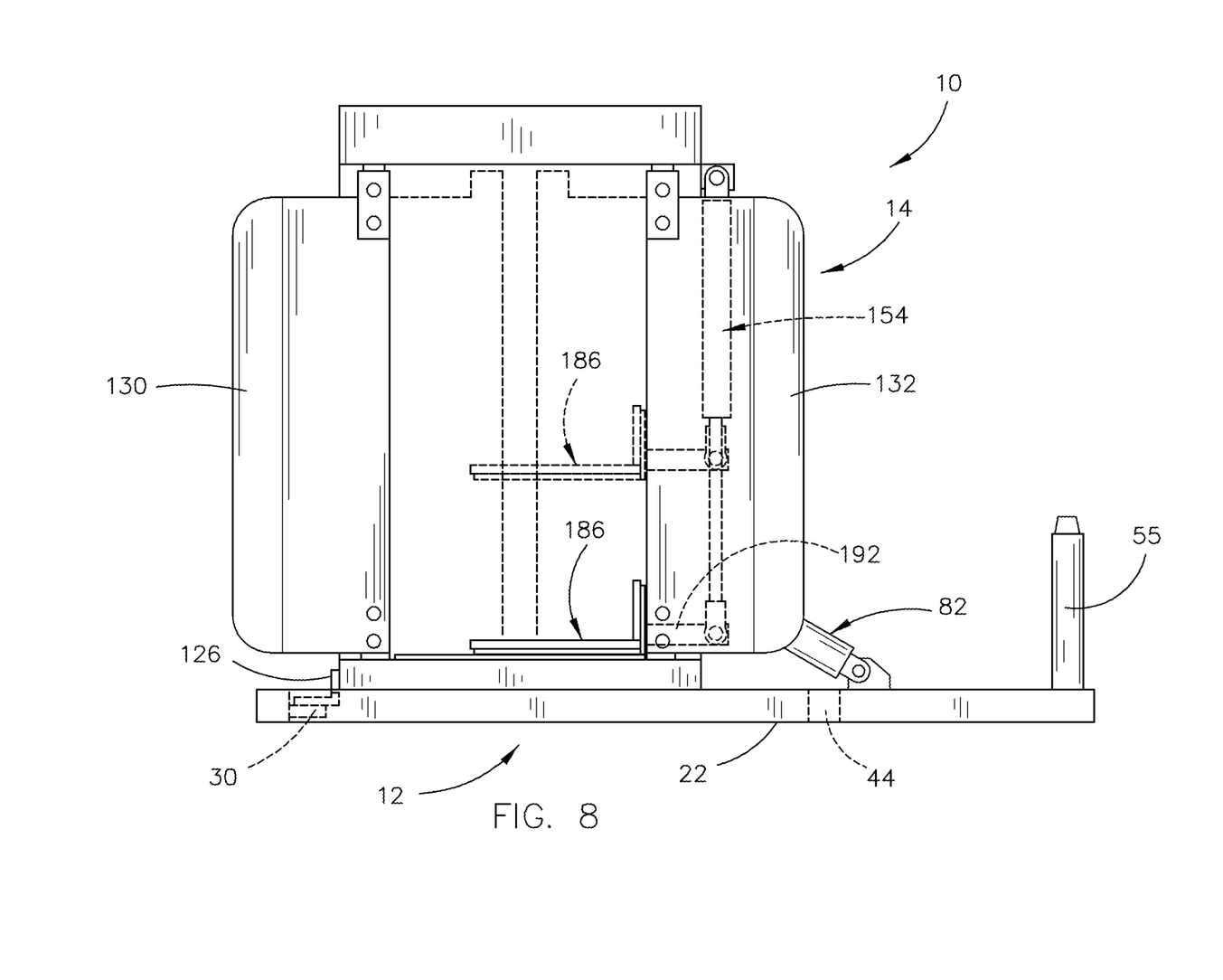
FIG. 8 is an end view of the invention with the entrance gate members being in an open position so that the animal support plate is visible and with the broken lines illustrating the animal support plate in its upper position.

The side panels 172 and 174 will normally be placed in their outer or non-squeezed positions. The hydraulic cylinder 154 will then be retracted which causes the flat portion 188 of the animal support 186 to be raised upwardly from the floor 180 of chute 14 until the flat portion 188 engages the underside of the animal between the front and rear legs of the animal which prevents the animal from lowering itself towards the floor 180 of the chute 14 during the forthcoming tipping operation. The hydraulic cylinders 82 and 86 are then extended which causes the chute 14 to be tipped or pivotally moved from the upright position of FIG. 2 to the dashed line position of FIG. 4 and the solid line position of FIG. 6. The floor members 182 and 184 are then opened as seen in FIG. 10 so that the legs and feet of the animal are accessible. In the position of FIG. 6, the chute 14 rests on the upper ends of support posts 55 and 56.

After the feet and/or legs of the animal have been treated, the floor members or doors 182 and 184 are closed. The hydraulic cylinders 82 and 86 are retracted which causes the chute 14 to be tipped or pivoted back to its normal upright position. The hydraulic cylinder 154 is then extended so that the flat portion 188 is lowered onto the floor 180. The neck stretcher 170 is then returned to its inoperative position. The exit gate members 166 and 168 are then opened to permit the animal to exit from the chute 14.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A tipping livestock animal handling chute apparatus, comprising:
   a horizontally disposed support frame having a first end, a second end, an inner end, and an outer end;
   a vertically disposed first support post, having upper and lower ends, extending upwardly from said support frame at said outer end thereof;
   a vertically disposed second support post, having upper and lower ends, extending upwardly from said support frame at said outer end thereof;
   said first and second support posts being horizontally spaced from one another;
   a vertically disposed first pivot post, having upper and lower ends, extending upwardly from said support frame inwardly of said outer end thereof;
   a vertically disposed second pivot post, having upper and lower ends, extending upwardly from said support frame inwardly of said outer end thereof;
   said first and second pivot posts being horizontally spaced from one another;
   a first hydraulic cylinder, having a base end and a rod end;
   said base end of said first hydraulic cylinder being pivotally secured to said support frame inwardly of said outer end thereof;
   said first hydraulic cylinder being movable between retracted and extended positions;
   a second hydraulic cylinder, having a base end and a rod end;
   said base end of said second hydraulic cylinder being pivotally secured to said support frame inwardly of said outer end thereof;
   said second hydraulic cylinder being movable between retracted and extended positions;
   said first and second hydraulic cylinders being horizontally spaced from one another;
   a livestock chute assembly which is selectively movably positioned on said support frame between said inner end of said support frame and said outer end of said support frame;
   said livestock chute assembly including:
   (a) a chute frame having an entrance end, an exit end, an upper end, a lower end, a first side and a second side;
   (b) a chute positioned within said chute frame and having an entrance gate assembly, an exit gate assembly, an upper end, a lower end, a first side, a second side
   (c) and a hinged floor at said lower end of said chute which is selectively movable between open and closed positions;
   said exit gate assembly comprising:
   (a) a first vertically disposed exit gate member horizontally movably secured to said chute frame;
   (b) said first vertically disposed exit gate member having an upper end, a lower end, a first side and a second side;
   (c) said vertically disposed exit gate member being movable between open and closed positions;
   (d) a second vertically disposed exit gate member which is horizontally movably secured to said chute frame;
   (e) a second vertically disposed exit gate member having an upper end, a lower end, a first side and a second side;
   (f) said second vertically disposed exit gate member being movable between open and closed positions;
   said first and second vertically disposed exit gate members, when in a partially open position, permitting the livestock animal to insert its head outwardly through the said first and second vertically disposed exit gate members whereby said first and second vertically disposed exit gate members, when subsequently closed, will trap the animal's head therebetween;
   said chute including first and second side panels which are movable between open and closed positions;
   said first and second side panels, when in said open positions, permitting a livestock animal to enter said chute and exit from said chute;
   said first and second side panels, when in said closed positions, squeezing the livestock animal therebetween;
   said upper end of said first pivot post being pivotally secured to said first side of said chute frame above said lower end of said chute frame at said entrance end of said chute frame;

said upper end of said second pivot post being pivotally secured to said first side of said chute frame above said lower end of said chute frame at said exit end of said chute frame;

said rod end of said first hydraulic cylinder being pivotally secured to said first side of said chute frame above said lower end of said chute frame;

said rod end of said second hydraulic cylinder being pivotally secured to said first side of said chute frame above said lower end of said chute frame;

the extension of said first and second hydraulic cylinders causing said chute frame and said chute to be pivotally moved between an upright position on said support frame to a tipped position with said chute frame resting on said upper ends of said first and second support posts when in said tipped position;

said hinged floor being movable from said closed position to said open position, when said chute frame and said chute are in said tipped position, whereby the legs and feet of an animal in said chute are accessible for treatment.

2. The tipping livestock handling chute apparatus of claim 1 wherein said chute includes an animal support plate which is movably positioned above a portion of said floor with said support plate being movable between a lower position above said floor to an upper position for engagement with the belly of the animal between the front and rear legs of the animal and wherein a third hydraulic cylinder extends between said chute frame and said support plate for selectively moving said support plate between said lower position and said upper position.

* * * * *